Oct. 25, 1966  W. F. FUERTGES  3,280,640
HYDRA-CUSHION BALANCER
Filed Aug. 23, 1963
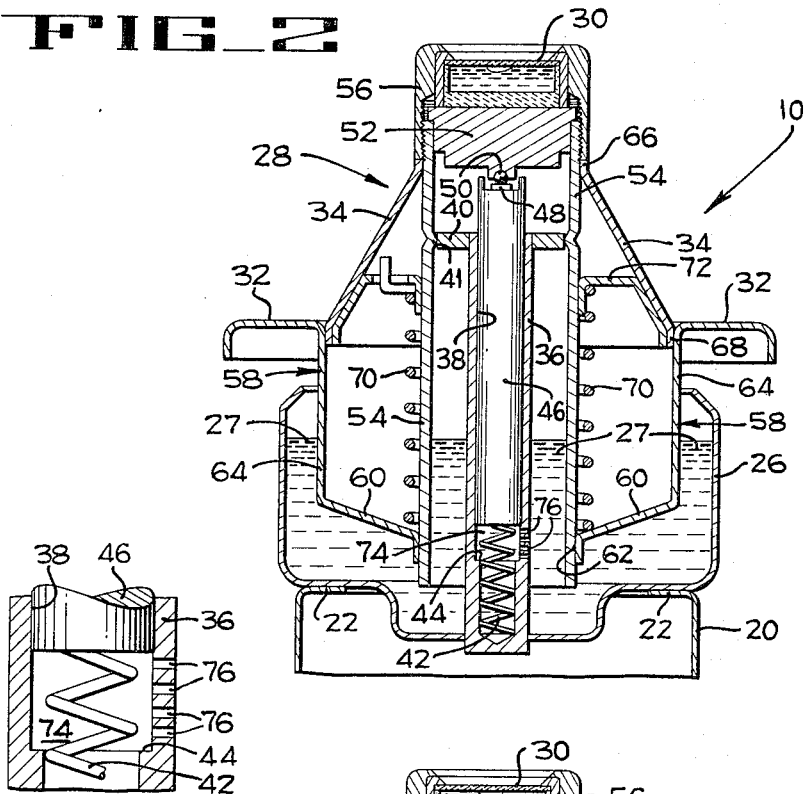
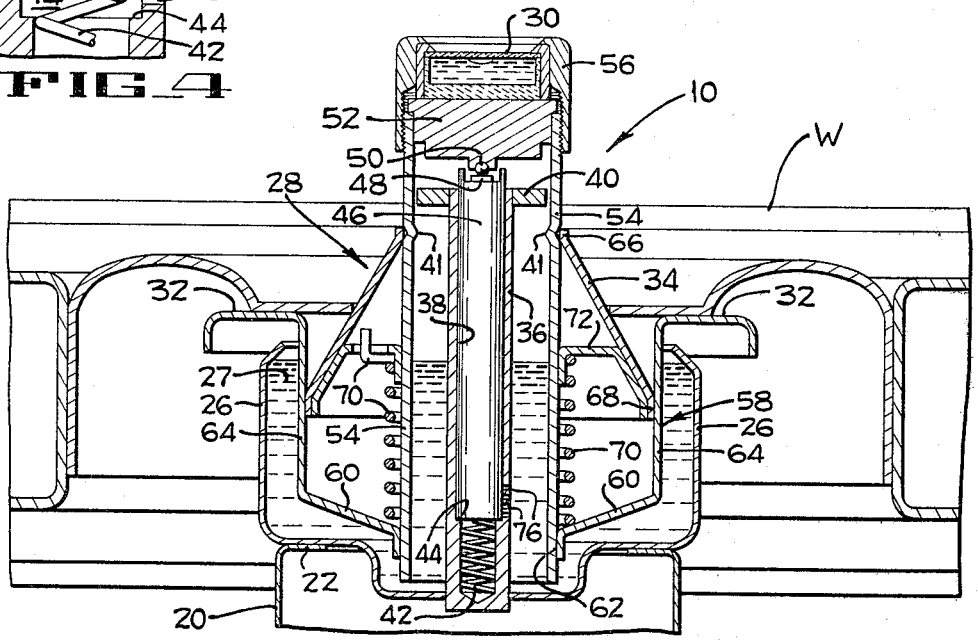
INVENTOR
WILLIAM F. FUERTGES
BY Hans G. Hoffmeister
ATTORNEY

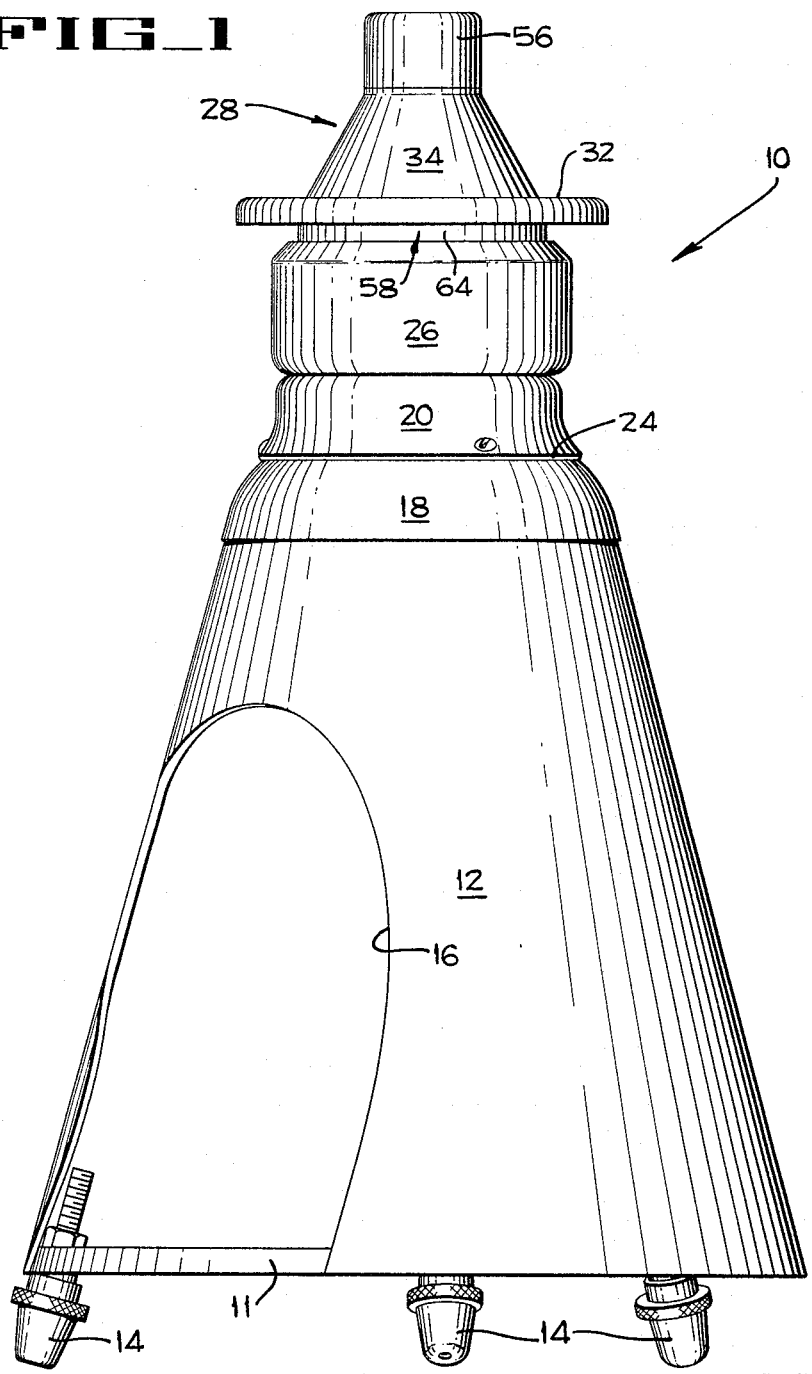

United States Patent Office 3,280,640
Patented Oct. 25, 1966

3,280,640
HYDRA-CUSHION BALANCER
William F. Fuertges, Kokomo, Ind., assignor to FMC Corporation, San Jose, Calif., a corporation of Delaware
Filed Aug. 23, 1963, Ser. No. 304,051
8 Claims. (Cl. 73—484)

This invention relates to a wheel balancer, and more particularly to a static wheel balancer which is automatically conditioned for balancing upon placement of a wheel thereon.

In use, static wheel balancers of the types disclosed herein are susceptible to rapid deterioration due to shock loads imparted to the balancing pivots when wheels are loaded and unloaded on the balancing element. One type of balancer includes operating mechanisms for establishing and disestablishing the associated pivotal members during balancing, and during the removal and placement of a wheel thereon, respectively. Another type of balancer maintains pivotal engagement of the associated balancing pivots at all times but requires moving the balancing head and the balancing pivots from a restrained position to permit free pivotal movement of the balancing head during the balancing operation.

An example of the second mentioned type is disclosed in U.S. application Ser. No. 251,547, filed January 15, 1963, now Patent No. 3,164,996, assigned to the same assignee of this invention.

The present invention is an improvement over the above mentioned wheel balancers since it eliminates the mechanism which moves the balancing head to a restrained and a non-restrained position and yet retains the function of maintaining the associated balancing pivots in contact at all times. More particularly, this invention provides an expansible and contractable chamber defined by a rod that is slidably disposed in a tubular member with the upper end of the rod extending outwardly from the upper end of the tubular member. The upper end of the rod pivotally supports the wheel balancing head and, in turn, the lower end of the rod is positionable against a suitable shoulder formed in the tubular member with such shoulder defining the limit to which the rod is retracted into the tubular member. A series of holes or orifices are formed through the wall of the tubular member and are vertically spaced between the lower end of the rod and the shoulder. The orifices provide communication between a reservoir of balancing head dampening liquid and the chamber. Thus, when the rod moves downwardly into the tubular member in response to the weight of the wheel placed on the balancing head, the liquid in the chamber is discharged through the oriifices to the reservoir of liquid. The downward movement of the rod toward the shoulder causes sequential blocking of the orifices and thus achieves an initial rapid acceleration of the rod, since all of the orifices are capable of permitting flow of fluid, and rapid deceleration immediately before the rod comes into engagement with the shoulder.

Accordingly, it is an object of this invention to provide a new and improved wheel balancer which is automatically conditioned for balancing.

Another object of this invention is to provide a new and improved wheel balancer employing a plurality of liquid throttling means which are sequentially rendered ineffective to cushion the movement of the balancing head to its balancing position.

A further object of this invention is to provide a new and improved wheel balancer which is simple in construction.

Still another object of this invention is to provide a new and improved wheel balancer having a resilient and a static fluid pressure biasing force for maintaining a pivotal connection in constant engagement.

These and other objects of this invention will become more apparent from the following detailed description taken in conjunction with the accompanying drawings wherein:

FIG. 1 is an elevation illustrating a wheel balancer constructed in accordance with the principles of this invention.

FIG. 2 is an enlarged longitudinal vertical section of the upper portion of the wheel balancer illustrated in FIG. 1.

FIG. 3 is similar to FIG 2 showing the position of the parts when a wheel to be balanced is placed thereon.

FIG. 4 is an enlarged fragmentary portion of FIG 2 showing the orifices.

A preferred embodiment of the wheel balancer is shown in FIG 1 and is generally indicated by the reference numeral 10. Particularly, the wheel balancer comprises a base plate 11 secured to the base of an upwardly extending truncated conical body 12. Suitably adjustable leveling feet 14 are threadedly secured to the lower surface of the plate 11, as shown. An opening 16 is formed in the body 12 to provide a compartment in which items, such as weights and tools, may be stored. A dish-shaped cap 18 is secured to the upper end of the body 12 to form a surface for supporting hereinafter described members of the balancing apparatus. A tubular member 20, having the upper end thereof formed inwardly to define a flange 22 (FIG. 2) and the lower end 24 defining an outwardly flared surface, is secured in any suitable manner, to the upper end of the cap 18. A fluid tight reservoir or bowl 26, of any appropriate form, has its base secured to the upper surface of the flange 22. The bowl 26 is adapted to retain a predetermined amount of liquid 27 which acts to damp oscillations of the hereinafter described balancing head. A balancing head 28, including a conventional level 30 and an annular horizontally disposed reference surface 32, is mounted for rocking movement about a predetermined vertical axis. A centering cone 34, spring biased upwardly toward an abutting shoulder formed on the spirit level housing, is provided to properly center the wheels to be balanced about the mentioned vertical axis.

FIGS. 2 and 3 show the manner in which the balancing head 28 is supported to effect rocking movement thereof about such vertical axis. To this end a tubular member 36, having a blind stepped bore 38, is provided and is secured to the bowl 26 to extend vertically upwardly with the longitudinal axis thereof defining the vertical axis about which the balancing head 28 is rockably mounted. Regardless of the method utilized to secure the member 36 to the bowl 26, the resulting joint must be fluid-tight to preclude leakage of damping fluid therethrough. An annular plate 40, secured to the upper outer periphery of the tubular member 36, and inwardly extending projections 41 carried by the balancing head 28 are included to center the head relative to the member 36 and to restrain the balancing head 28 against rocking pivotal movement when the balancer is not being used. The stepped bore 38 has, at the lower end thereof, a compression spring 42 having one end thereof seated against the lower end wall of the bore. A shoulder 44, defining the transition between the larger and smaller bores, abuttingly engages a portion of the lower end of a rod 46 which is closely, slidably disposed in the larger of the bores in the tubular member 36. It should be noted that the lower end of the rod 46 abuttingly engages the upper end of the compression spring 42 thereby biasing the rod 46 upwardly as viewed in FIGURES 2 and 3. A hardened insert 48 is mounted on the upper end of the rod 46 to provide a planar surface for rolling contact of a ball 50 captively secured to a cap 52, which forms part of the balancing head 28.

The balancing head 28 comprises an elongated tubular member 54 which is vertically disposed in surrounding relation with the tubular member 36. The upper end of member 54 is threadedly engaged by a shell 56 which rigidly secures the cap 52 and the spirit level 30 to the member 54. A bell-shaped support 58, inverted so that the mouth thereof extends upwardly, has an inwardly and downwardly diverging wall 60 which terminates in a circular opening 62, with the wall defining such opening being secured to the lower outer peripheral surface of the tubular member 54 in liquid-tight engagement. The support 58 also includes an upwardly extending circumferential wall 64 which has a selected portion thereof formed horizontally outwardly to define the reference surface 32. It should be noted that the tubular member 54 and the bell-shaped support 58 are an integral structure that is pivotable about the point of contact of the ball 50 and the hardened support 48.

To insure proper orientation of the wheels to be balanced about their mounting axis of rotation the disclosed wheel balancer provides the centering cone 34 having the upper and lower ends thereof, 66 and 68 respectively, closely slidably engagable with the outer periphery of the tubular member 54 and the inner periphery of the circumferential walls 64. A spring 70, disposed about the member 54, has the lower end thereof abuttingly engaged with the intersection of the member 54 and the inwardly and downwardly diverging wall 60. A washer-like partition 72, secured to the inner surface of the cone 34 and slidably engaged with the outer surface of the tubular member 54, is included to provide a reaction surface for the upper end of the spring 70 so that the cone 34 is constantly urged upwardly toward the spirit level 30. The limit of the upward movement of the cone 34 is shown in FIG. 2. When a wheel is placed on the balancer, the outer surface of the cone 34 is engaged by the central opening of the wheel, with the weight of the wheel being sufficient to compress the spring 70, and move the cone 34 downwardly until a portion of the wheel engages the reference surface 32 as shown in FIG. 3.

Rapid deterioration of wheel balancers of the character described as caused when shock forces, greater than the elastic limit, are imparted to the ball 50 and the insert 48. Such forces occur during the loading and unloading of wheels on the balancer. This invention provides a structure which precludes injury to the ball by providing communication between the damping fluid 27 and a chamber or cavity formed by the lower end of the rod 46 and the bore 38. The upward bias, imparted to the rod 46 by the spring 42, is sufficient to support the balancing head 30, the associated tubular member 54, and the bell-shaped support 58 in the position shown in FIG. 2. As shown in greater detail in FIGURE 4, a cavity 74, defined by the lower end of the rod 46 and the shoulder 44, is provided. Orifices 76 extending through the tubular member 36 provide communication between the damping fluid 27 and the cavity 74. In this manner the portion of the bore 38 between the lower end of the rod 46 and the lower extremity of bore 38 is completely filled with the damping fluid. During the time when the balancer does not have a wheel positioned thereon, the position of the rod 46 with respect to the orifices 76 is shown in FIGURES 2 and 4. It should be readily appreciated that the orifices 76 may be circumferentially spaced with respect to each other and therefore need not be formed in the tubular member 36 with the axis thereof contained in a common plane as shown.

When the wheel W is placed upon the reference surface 32 as shown in FIGURE 3, the weight of the wheel, transmitted to the rod 46 through the hardened support 48 and the ball 50, causes the rod 46 to move downwardly toward the shoulder 44. During such movement the fluid in the cavity 74 is discharged through the orifices 76. Initial movement of the rod 46 in the described direction causes all of the orifices 76 to discharge fluid from the cavity 74 to the supply of fluid 27. As the rod continues downwardly, the uppermost orifice is blocked by the rod 46, thus only the lower remaining orifices are in communication with the damping fluid 27. As the rod 46 continues downwardly, each of the remaining orifices are sequentially blocked by the rod 46 until a portion of the lower end of the rod 46 comes into abutting engagement with the shoulder 44. Since the rod 46 does not include a sealing device, such as an O-ring of a packing, the fluid between the lowermost orifices and the shoulder 44 leaks past the rod 46 upwardly toward the orifices 76. In this manner the rod 46 is solidly seated against the shoulder 44. Thus, it is seen that loading of a wheel on the balancer effects a rapid initial acceleration of the rod 46 toward the shoulder 44 by virtue of the fact that all of the orifices are open to permit flow of fluid to the reservoir or source of damping fluid, and as the rod 46 moves downwardly in response to the weight of the wheel the orifices are sequentially or successively blocked reducing the area of flow which causes in turn a rapid deceleration of the rod 46 prior to its abutting engagement with the shoulder 44.

If desired, the diameter of the orifice 76 may have progressively smaller diameters in order to achieve any desired characteristics of initial acceleration and terminal deceleration as the lower end of the rod 46 comes into abutting engagement with the shoulder 44.

In describing the operation of this invention it should be kept in mind that the ball 50 and the hardened support 48 are maintained in constant contact irrespective of the presence or absence of the wheel W on the balancer 10. In operation, a wheel to be balanced is placed on the balancer as shown in FIGURE 3. The weight of the wheel is transferred by the bell-shaped support 58 to the tubular member 54, to the cap 52 and, to the rod 46 through the ball 50 and the hardened support 48. The weight acts downwardly in opposition to the upwardly directed bias of the spring 42 and the static pressure of the damping fluid 27 is transmitted to the cavity 74 through the orifices 76. Since the magnitude of the upward biasing force is less than the downward force derived from the weight of the wheel the rod 46 moves downwardly toward the shoulder 44. During such movement the fluid in the cavity 74 is discharged initially through all of the orifices 76. As the rod continues downwardly, the uppermost orifice is blocked by the rod 46, and the fluid in the cavity 74 is discharged to the source of damping fluid 27 through the remaining open orifices. Continued downward movement of the rod 46 sequentially or successively blocks the remaining orifices.

As the successive orifices become blocked, the area of fluid flow is reduced accordingly, thus causing increasing resistance to movement of the rod 46 toward the shoulder 44. Such increasing resistance accomplishes a concomitant reduction of the rate of velocity of the rod 46. When the lower end surface of the rod 46 is abuttingly engaged with the shoulder 44 as shown in FIG. 3, the balancer is then in condition to indicate, by means of the spirit level 30, whether and to what degree the wheel W is out of balance. By application of suitable weights to peripheral portions of the rim of the wheel indicated by the spirit level 30, the operator causes the wheel to assume a balanced condition.

As a result of this invention therefore, a balancer has been provided that is automatically conditioned for balancing of wheels by placing a wheel to be balanced on a selected portion thereof. This invention has also provided an apparatus which maintains the balancing pivot in constant engagement with a hardened support and yet provides means whereby shock loads derived from placement of wheels on the apparatus are absorbed by discharging a quantity of fluid to a reservoir of fluid that is vented to the atmosphere.

While a preferred embodiment of the present invention has been described herein, it should be noted that various changes may be made without departing from the spirit of the invention as defined in the appended claims.

The invention having thus been described, what is believed to be new and desired to be protected by Letters Patent is:

1. An apparatus for statically balancing wheels comprising a support, a tubular member secured to said support to extend vertically therefrom, a rod slidably disposed in said tubular member, a balancing head, means for rockably mounting said balancing head on the upper end of said rod, means in said tubular member for urging said rod upwardly to a predetermined upper limit, means in said tubular member abuttingly engageable with the lower end of said rod for defining a lower limit, and vertically spaced fluid throttling means in said tubular member located between such upper and lower limits for controlling the movement of said rod downwardly toward said lower limit.

2. An apparatus for statically balancing wheels comprising a support, a vertically extending tubular member having the lower end thereof secured to said support, a rod slidably disposed in said tubular member, a balancing head, means for rockably mounting said balancing head on the upper end of said rod, spring means in said tubular member for urging said rod upwardly to an upper limit, shoulder means in said tubular member for limiting slidable movement of said rod downwardly to a lower limit, and vertically spaced orifices in said tubular member located between such upper and lower limits for providing communication between the interior of said tubular member and a source of fluid.

3. An apparatus for statically balancing wheels comprising a support, a vertically extending tubular member secured to said support, a rod slidably disposed in said tubular member and defining a chamber of variable volume with the lower end of said rod constituting the movable wall of said chamber, a balancing head, means for rockably mounting said balancing head on the upper end of said rod, spring means in said tubular member engaging such lower end of said rod for urging said rod vertically upwardly to a predetermined first limit, means in said tubular member engageable with the lower end of said rod when said rod moves downwardly for defining a second limit, and vertically spaced orifices located between such first and second limits providing communication between said chamber and a source of fluid.

4. The combination of claim 3 wherein the movement of said rod from said first to said second limit in response to a wheel positioned on said balancing head, causes said rod to successively interrupt flow of fluid through said orifices to control the rate at which said rod moves toward said second limit.

5. In a static wheel balancer of the type wherein a wheel supporting balancing head is pivotally supported on the upper end of a vertically extending rod and a source of liquid is provided for damping the pivotal movement of such head, the combination with said balancing head of means for reciprocably receiving said rod for reciprocation between vertically spaced limits, said rod being disposed at the lower of said limits when a wheel is placed on said balancing head, and conduit means in said first mentioned means located between said limits providing communication for said source of liquid with the lower end of said rod for controlling the rate at which said rod moves toward the lower of said limits.

6. In a static wheel balancer of the type having a wheel supporting balancing head pivotally supported on the upper end of a vertically extending rod and having a source of liquid for damping the pivotal movement of said head, the combination with said balancing head of a tubular member for reciprocably receiving said rod for reciprocation between selected vertically spaced planes which define the effective vertical dimension of a chamber, said rod having the lower end thereof locatable in the lower one of said planes in response to the placement of a wheel on said balancing head, means in said tubular member for imparting a constantly acting upward biasing force to said rod in order to locate the lower end of said rod in the upper one of said planes in response to the removal of a wheel from said balancing head, and a plurality of spaced orifices in said tubular member located between said planes providing communication of said source of liquid with said chamber for controlling the rate at which said rod moves toward the lower one of said limits.

7. An apparatus for statically balancing wheels comprising a support, a vertically extending tubular member secured to said support, said tubular member having concentric bores of different diameter which defines a shoulder, a rod slidably disposed in the larger bore of said tubular member, a balancing head, means for rockably mounting said balancing head on the upper end of said rod, spring means in the smaller bore of said tubular member for slidably moving said rod upwardly to locate the lower end thereof upwardly away from said shoulder, and vertically spaced orifices in said larger bore of said tubular member located between said shoulder and the lower end of said rod when said rod is away from said shoulder for establishing communication between the interior of said tubular member and a source of fluid.

8. A static wheel balancer comprising a support, a tubular member mounted on said support to extend vertically upwardly and including upper and lower communicating bores with the upper bore being of larger diameter, said bores defining a shoulder at the lower portion of said tubular member, a rod slidably disposed in the larger bore, a wheel supporting balancing head rockably mounted on the upper end of said rod, cooperating balancing pivots on said balancing head and said rod, a spring in the smaller bore for urging said pivots into constant engagement and said rod upwardly to locate the lower end thereof away from said shoulder, a source of balancing head damping liquid, vertically spaced orifices in said tubular member in communication with said damping fluid and located between said shoulder and the lower end of said rod when said rod is upwardly away from said shoulder, wherein placement of a wheel on said balancing head causes said rod to move downwardly in said larger bore against the urging of said spring and causes discharge of liquid through said orifices to said source of damping fluid, such downward movement of said rod is effective to sequentially block said orifices with all of said orifices being blocked when the lower end of said rod is in abutting engagement with said shoulder.

References Cited by the Examiner

UNITED STATES PATENTS

| | | | |
|---|---|---|---|
| 1,701,464 | 2/1929 | Kraft | 73—483 |
| 2,349,288 | 5/1944 | Lannen | 73—485 |
| 2,502,633 | 4/1950 | Shepard | 73—484 |
| 2,589,456 | 3/1952 | Tinkham | 73—483 |
| 2,898,764 | 8/1959 | Kinsey et al. | 73—483 |
| 3,164,996 | 1/1965 | Carrigan | 73—483 |

RICHARD C. QUEISSER, *Primary Examiner.*

JAMES J. GILL, *Examiner.*